(12) United States Patent
Niessner et al.

(10) Patent No.: US 11,130,276 B2
(45) Date of Patent: Sep. 28, 2021

(54) USE OF MOLDING MATERIALS BASED ON VINYL AROMATIC/DIENE BLOCK COPOLYMERS FOR 3-D-PRINTING

(71) Applicant: INEOS STYROLUTION GROUP GMBH, Frankfurt (DE)

(72) Inventors: Norbert Niessner, Friedelsheim (DE); Frank Eisentraeger, Cologne (DE)

(73) Assignee: INEOS STYROLUTION GROUP GMBH, Frankfurt am Main (DE)

( * ) Notice: Subject to any disclaimer, the term of this patent is extended or adjusted under 35 U.S.C. 154(b) by 579 days.

(21) Appl. No.: 15/105,853

(22) PCT Filed: Dec. 18, 2014

(86) PCT No.: PCT/EP2014/078488
§ 371 (c)(1),
(2) Date: Jun. 17, 2016

(87) PCT Pub. No.: WO2015/091814
PCT Pub. Date: Jun. 25, 2015

(65) Prior Publication Data
US 2016/0319122 A1 Nov. 3, 2016

(30) Foreign Application Priority Data
Dec. 18, 2013 (EP) .................................... 13198149

(51) Int. Cl.
| | | |
|---|---|---|
| *B29C 64/118* | (2017.01) | |
| *B33Y 70/00* | (2020.01) | |
| *C08L 25/04* | (2006.01) | |
| *C08L 53/02* | (2006.01) | |
| *B33Y 10/00* | (2015.01) | |
| *B29K 25/00* | (2006.01) | |
| *B29K 105/00* | (2006.01) | |

(52) U.S. Cl.
CPC ............ *B29C 64/118* (2017.08); *B33Y 10/00* (2014.12); *B33Y 70/00* (2014.12); *C08L 25/04* (2013.01); *C08L 53/02* (2013.01); *B29K 2025/00* (2013.01); *B29K 2025/04* (2013.01); *B29K 2105/0005* (2013.01)

(58) Field of Classification Search
None
See application file for complete search history.

(56) References Cited

U.S. PATENT DOCUMENTS

| | | | |
|---|---|---|---|
| 3,280,084 A | | 10/1966 | Zelinksi et al. |
| 3,530,094 A | | 9/1970 | Schnell et al. |
| 3,535,280 A | | 10/1970 | Schnell et al. |
| 3,637,554 A | | 1/1972 | Childers et al. |
| 3,954,722 A | * | 5/1976 | Echte .................. C08F 2/02 526/68 |
| 3,985,830 A | | 10/1976 | Fetters et al. |
| 4,091,053 A | | 5/1978 | Kitchen |
| 4,408,036 A | * | 10/1983 | Gaymans ............... C08G 69/28 528/335 |
| 4,446,304 A | * | 5/1984 | Gaymans ............... B29C 67/24 264/319 |
| 4,460,762 A | * | 7/1984 | Gaymans ............... C08G 69/28 528/335 |

(Continued)

FOREIGN PATENT DOCUMENTS

| | | | |
|---|---|---|---|
| CN | 1626573 A | | 6/2005 |
| CN | 1666217 A | | 9/2005 |

(Continued)

OTHER PUBLICATIONS

English Abstract of DE 102007061445, retrieved from espace.net on May 30, 2016.

*Primary Examiner* — Joseph S Del Sole
*Assistant Examiner* — Manley L Cummins, IV
(74) *Attorney, Agent, or Firm* — J.A. Lindeman & Co., PLLC

(57) ABSTRACT

The invention relates to the use of molding materials for 3-D printing, containing components A, B1, B2, and C, wherein: A:5 to 100 wt % of at least one vinyl aromatic/diene block copolymer A, containing: a) 30 to 95 wt % of at least one vinyl aromatic and b) 5 to 70 wt % of at least one diene, B1:0 to 95 wt % of at least one polymer B1 selected from the group comprising standard polystyrene, high-impact polystyrene (HIPS), styrene/acrylonitrile copolymers, α-methylstyrene/acrylonitrile copolymers, styrene/maleic anhydride copolymers, styrene/phenylmaleimide copolymers, styrene/methylmethacrylate copolymers, styrene/acrylonitrile/maleic anhydride copolymers, styrene/acrylonitrile/phenylmaleimide copolymers, methylstyrene/acrylonitrile/methylmethacrylate copolymers, α-methylstyrene/acrylonitrile/t-butyl methacrylate copolymers, and styrene/acrylonitrile/t-butyl methacrylate copolymers, B2:0 to 60 wt % of one or more further polymers B2 selected from: polycarbonates, polyamides, poly(meth)acrylates, polyesters, semicrystalline polyolefins, and polyvinyl chloride, C:0 to 50 wt % of common additives and auxiliary agents, wherein the viscosity (measured as per ISO 11443) of the molding material at shear rates of 1 to 10 1/s and at temperatures of 250° C. is not greater than $1\times10^5$ Pa*s and the melt volume rate (MVR, measured as per ISO 1133 at 220° C. and 10 kg load) is more than 6 ml/10 min.

13 Claims, No Drawings

(56) References Cited

U.S. PATENT DOCUMENTS

| | | | |
|---|---|---|---|
| 4,537,949 A | 8/1985 | Schmidt et al. | |
| 4,540,772 A | 9/1985 | Pipper et al. | |
| 5,121,329 A * | 6/1992 | Crump | B22F 3/115 700/119 |
| 5,866,058 A * | 2/1999 | Batchelder | B29C 64/106 264/237 |
| 6,022,207 A * | 2/2000 | Dahlin | B33Y 30/00 242/563.2 |
| 6,031,053 A | 2/2000 | Knoll et al. | |
| 6,177,517 B1 | 1/2001 | Guntherberg et al. | |
| 6,323,279 B1 * | 11/2001 | Guntherberg | C08F 279/04 525/70 |
| 6,410,654 B1 * | 6/2002 | Desbois | C08F 279/02 525/244 |
| 6,521,712 B1 | 2/2003 | Knoll et al. | |
| 6,593,430 B1 * | 7/2003 | Knoll | C08F 297/04 525/271 |
| 7,067,589 B2 * | 6/2006 | Bening | C08F 287/00 525/280 |
| 2003/0004600 A1 * | 1/2003 | Priedeman, Jr. | D01F 1/10 700/119 |
| 2003/0158335 A1 * | 8/2003 | Guntherberg | C08K 5/005 525/92 D |
| 2005/0075455 A1 * | 4/2005 | Chang | C08L 25/12 525/78 |
| 2005/0173839 A1 * | 8/2005 | Crump | B29C 33/3842 264/401 |
| 2008/0071030 A1 | 3/2008 | Priedeman, Jr. | |
| 2009/0044906 A1 * | 2/2009 | Goring | B29C 65/1425 156/272.8 |
| 2009/0295032 A1 | 12/2009 | Hopkins | |
| 2010/0104832 A1 * | 4/2010 | Messe | G03F 7/038 428/201 |
| 2010/0304088 A1 * | 12/2010 | Steeman | C08G 59/68 428/156 |
| 2013/0317164 A1 * | 11/2013 | Hermes | C08F 222/08 524/549 |
| 2015/0125682 A1 * | 5/2015 | Greger | C08L 53/00 428/217 |
| 2016/0297103 A1 * | 10/2016 | Lee | D01F 6/30 |

FOREIGN PATENT DOCUMENTS

| | | | | |
|---|---|---|---|---|
| CN | 101311216 A | | 11/2008 | |
| DE | 1495730 A1 | | 4/1969 | |
| DE | 1300266 B | | 7/1969 | |
| DE | 19728629 A1 | * | 1/1999 | ............ C08F 279/04 |
| DE | 10026858 A1 | * | 12/2001 | ............ C08K 5/005 |
| DE | 102007061445 A1 | | 6/2009 | |
| EP | 0038094 B1 | | 7/1984 | |
| EP | 0129195 A2 | | 12/1984 | |
| EP | 0129196 A2 | | 12/1984 | |
| EP | 0038582 B1 | | 8/1985 | |
| EP | 0039524 B2 | | 4/1989 | |
| EP | 1520879 A1 | | 4/2005 | |
| EP | 1537977 A1 | | 6/2005 | |
| EP | 1015215 B1 | | 3/2008 | |
| EP | 1087862 B1 | | 6/2008 | |
| EP | 1497093 B1 | | 12/2011 | |
| GB | 1402323 | * | 3/1973 | |
| GB | 1472195 A | | 5/1977 | |
| KR | 10-0890598 B1 | | 3/2009 | |
| WO | 95/35335 A1 | | 12/1995 | |
| WO | 96/20248 A1 | | 7/1996 | |
| WO | 00/58380 A1 | | 10/2000 | |
| WO | 02/093360 A1 | | 11/2002 | |
| WO | 2004/003823 A1 | | 1/2004 | |
| WO | WO-2005005536 A1 | * | 1/2005 | ............ C08L 25/12 |

* cited by examiner

USE OF MOLDING MATERIALS BASED ON VINYL AROMATIC/DIENE BLOCK COPOLYMERS FOR 3-D-PRINTING

The invention relates to the use of a molding composition based on vinylaromatic/diene block copolymers having optimized toughness/viscosity balance and to the use thereof for 3D printing.

The use of amorphous thermoplastics for 3D printing, especially of ABS, is known. EP-A 1015215, for instance, describes a method for producing a three-dimensional object of predetermined shape from a material which can be consolidated thermally. For the 3D printing, the material is first fluidized and extruded, and two or more layers of the material are applied to a support, with movement, and then the shaped material is consolidated by cooling to below the solidification temperature of the material. Thermally consolidable material used comprises amorphous thermoplastics, especially acrylonitrile-butadiene-styrene (ABS).

EP-A 1087862 describes a rapid prototyping system for producing a three-dimensional article by extrusion and application of solidifiable thermoplastic modeling and support material in a plurality of layers. The thermoplastic material is supplied via a spool. ABS is cited as a suitable modelable material. As fragmentary support material, which is removed following completion of the 3D model, a mixture of ABS and a polystyrene copolymer as filling material with a fraction of up to 80% is used.

EP-A 1497093 describes a method for producing a prototype of a plastics injection molding from a thermoplastic material, which in fluidized form is injected into a mold until it fills the cavity of said mold and, after curing, forms the prototype. This prototype is produced via "Fused Deposition Molding", a specific 3D printing method. The thermoplastic material is selected from: ABS, polycarbonate, polystyrene, acrylates, amorphous polyamides, polyesters, PPS, PPE, PEEK, PEAK, and mixtures thereof, with ABS being preferred. Contraction phenomena are avoided using preferably amorphous thermoplastics.

US 2008/0071030 describes a thermoplastic material which is used for producing three-dimensional models by multilayer deposition.

The thermoplastic material comprises a base polymer selected from the group consisting of: polyethersulfones, polyetherimides, polyphenylsulfones, polyphenylenes, polycarbonates, polysulfones, polystyrenes, acrylates, amorphous polyamides, polyesters, nylon, polyetheretherketones, and ABS, and 0.5 to 10 wt % of a silicone release agent. Preference as base polymer is given to using polyethersulfone and mixtures thereof with polystyrene (3-8 wt %). In order to avoid contraction, preference is given to using amorphous polymers and optionally customary filling materials.

US 2009/0295032 proposes modified ABS materials for 3D printing. The ABS materials are modified by additional monomers, oligomers or polymers, more particularly acrylates. Given as an example are MMA-modified ABS/poly(styrene-acrylonitrile) blends.

The aforementioned materials, however, are often too brittle for 3D printing, and are deserving of improvement in relation both to toughness and to their odor. With the materials of the prior art, furthermore, the viscosity, under the conditions of the melt flow index at low shear rates, is often too high and is likewise deserving of improvement.

It is an object of the invention to provide improved, low-odor thermoplastic materials for 3-D printing with optimized toughness/viscosity balance. The object has been achieved by the use of a molding composition for 3D printing as described below:

Subject matter of the invention is the use of molding compositions for 3D printing, comprising (or consisting of) components A, B1, B2, and C:

A: 5 to 100 wt % of at least one vinylaromatic-diene block copolymer A, more particularly a styrene-butadiene block copolymer, containing:
  a) 30 to 95 wt % of at least one vinylaromatic, more particularly styrene, and
  b) 5 to 70 wt % of at least one diene, more particularly butadiene, where a) and b) add up to 100 wt %,
B1: 0 to 95 wt % of at least one polymer B1 selected from the group consisting of: Standard polystyrene, high-impact polystyrene (HIPS), styrene-acrylonitrile copolymers, α-methylstyrene-acrylonitrile copolymers, styrene-maleic anhydride copolymers, styrene-phenyl-maleimide copolymers, styrene-methyl methacrylate copolymers, styrene-acrylonitrile-maleic anhydride copolymers, styrene-acrylonitrile-phenylmaleimide copolymers, α-methylstyrene-acrylonitrile-methyl methacrylate copolymers, α-methylstyrene-acrylonitrile-tert-butyl methacrylate copolymers, and styrene-acrylonitrile-tert-butyl methacrylate copolymers,
B2: 0 to 60 wt % of one or more further polymers B2 selected from: polycarbonates, polyamides, poly(meth)acrylates, polyesters, semicrystalline polyolefins, and polyvinyl chloride,
C: 0 to 50 wt % of customary additives and auxiliaries,
where the fractions of A, B1, B2, and C are in each case based on the overall molding composition, and their sum makes 100 wt %,
characterized in that the viscosity (measured to ISO 11443) of the molding composition at shear rates of 1 to 10 1/s and at temperatures of 250° C. is not higher than $1 \times 10^5$ Pa*s and the melt volume rate (MVR, measured to ISO 1133 at 220° C. and 10 kg load) is more than 6 ml/10 min.

For the purposes of the present invention, 3D printing means the production of three-dimensional moldings with the aid of an apparatus (3D printer) suitable for 3D printing.

In the molding composition used in accordance with the invention, the fraction of the component A is generally 5 to 100 wt %, preferably 20 to 100 wt %, more preferably 30 to 80 wt %, very preferably 40 to 60 wt %, based on the overall molding composition.

The fraction of the component B1 is generally 0 to 95 wt %, preferably 0 to 80 wt %, more preferably 20 to 70 wt %, very preferably 40 to 60 wt %, based on the overall molding composition.

If polymer B1 is present in the molding composition, its minimum fraction is customarily 0.1 wt %.

The fraction of the component B2 is generally 0 to 60 wt %, preferably 0 to 30 wt %, more preferably 0 to 20 wt %, based on the overall molding composition. If polymer B2 is present in the molding composition, its minimum fraction is customarily 0.1 wt %.

The fraction of the additives and/or auxiliaries C is generally 0 to 50 wt %, preferably 0.1 to 30, more preferably 0.2 to 10 wt %, based on the overall molding composition. If additives and/or auxiliaries C are present in the molding composition, their minimum fraction is customarily 0.1 wt %.

The sum of the components A and optionally B1, B2 and/or C present in the overall molding composition makes 100 wt %.

Preference is given to a molding composition consisting of components A, B1, B2, and C.

Particular preference is given to a molding composition of the invention comprising or consisting of components A, B1, and C.

With further preference, the molding composition used in accordance with the invention comprises substantially amorphous polymers, meaning that in other words at least half (at least 50 wt %) of the polymers present in the molding composition are amorphous polymers.

Vinylaromatic-Diene Block Copolymer A

The vinylaromatic-diene block copolymers A used in accordance with the invention have in general average molar masses Mw (weight average) of 80 000 to 300 000 g/mol, preferably 100 000 to 250 000 g/mol, more preferably 120 000 to 200 000 g/mol. Here it is also possible for 20% of the vinylaromatic-diene block copolymers A to have molar masses higher or lower than those stated above, based on the total amount of the vinylaromatic-diene block copolymers A employed.

The weight-average molar mass Mw is determined by GPC with UV detection.

The block copolymers A may have a linear or a star-shape structure.

The vinylaromatic-diene block copolymer A is preferably a styrene-butadiene block copolymer.

In the case of the styrene/butadiene monomer combination, the weight fraction of the diene in the entirety of the block copolymer A is preferably 15-65 wt %, that of the vinylaromatic component, correspondingly, being preferably 85-35 wt %.

Particularly preferred are butadiene-styrene block copolymers A having a monomer composition of 25-60 wt % diene and 75-40 wt % styrene.

The block copolymers A are prepared preferably by sequential anionic polymerization.

Vinylaromatic-diene block copolymers A suitable for the invention are known. Their preparation is described for example in "Modern Styrenic Polymers: Polystyrenes and Styrenic Copolymers" (Eds., J. Scheirs, D. Priddy, Wiley, Chichester, UK, (2003), pages 502 to 507) or in K. Knoll, N. Nießner, ACS Symp. Ser. 696, 112 (1998).

Additionally, for example, suitable vinylaromatic-diene block copolymers A are also available commercially as Styrolux® or Styroflex® (manufacturer: Styrolution, Frankfurt).

Preference is given in accordance with the invention to using vinylaromatic-diene block copolymers A1 that comprise at least two hard blocks S1 and S2 of vinylaromatic monomers and at least one soft block inbetween of dienes and optionally vinylaromatic monomers, the fraction of the hard blocks being more than 40 wt %, based on the overall block copolymer.

Vinylaromatics which can be used, both for the hard blocks S1 and S2 and for the soft blocks, are styrene, a-methylstyrene, p-methylstyrene, ethylstyrene, tert-butylstyrene, vinyltoluene or mixtures thereof. Styrene is preferably used.

Dienes used for the soft block B and/or B/S are preferably butadiene, isoprene, 2,3-dimethylbutadiene, 1,3-pentadiene, 1,3-hexadienes or piperylene, or mixtures thereof. Particular preference is given to using 1,3-butadiene.

The soft block is identified as B or, if formed from dienes and vinylaromatic monomers, as B/S.

Preferred block copolymers A1 contain external hard blocks S1 and S2 with different block lengths. The molecular weight of S1 is preferably in the range from 5000 to 30 000 g/mol, more particularly in the range from 10 000 to 20 000 g/mol. The molecular weight of S2 is preferably above 35 000 g/mol. Preferred molecular weights of S2 are in the range from 50 000 to 150 000 g/mol.

Between the hard blocks S1 and S2 there may also be two or more soft blocks. Preference is given to at least 2, preferably random, soft blocks $(B/S)_1$ and $(B/S)_2$ with different fractions of vinylaromatic monomers and hence different glass transition temperatures.

The block copolymers A1 may have a linear or a star-shape structure.

As a linear block copolymer A1, preference is given to using one of the structure $S1-(B/S)_1-(B/S)_2-S2$. The molar ratio of vinylaromatic monomer to diene, S/B, in the block $(B/S)_1$ is preferably below 0.25 and in the block $(B/S)_2$ is preferably in the range from 0.5 to 2.

Star-shape block copolymers A1 are preferably those having a structure composed of at least one star arm of the block sequence S1-(B/S) and one star arm of the block sequence S2-(B/S), or those having at least one star arm of the block sequence S1-(B/S)-S3 and at least one star arm of the block sequence S2-(B/S)-S3. S3 here is a further hard block of the stated vinylaromatic monomers.

Particularly preferred are star-shaped block copolymers A1 having structures which feature at least one star arm with the block sequence $S1-(B/S)_1-(B/S)_2$ and at least one star arm with the block sequence $S2-(B/S)_1-(B/S)_2$, or which feature at least one star arm with the block sequence $S1-(B/S)_1-(B/S)_2-S3$ and at least one star arm with the block sequence $S2-(B/S)_1-(B/S)_2-S3$. The molar ratio of vinylaromatic monomer to diene, S/B, in the outer block $(B/S)_1$ is preferably in the range from 0.5 to 2 and in the block $(B/S)_2$ is preferably below 0.5.

The above-described vinylaromatic-diene block copolymers A1 are more particularly styrene-butadiene block copolymers.

The block copolymers A1 are prepared preferably by sequential anionic polymerization.

The above-stated block copolymers A1 are known. Their preparation is described for example in WO 00/58380 A1 (pages 4 to 6).

Further preferred vinylaromatic-diene block copolymers A (SBC) are rubber-elastic block copolymers A2 composed of a block S, which features copolymerized units of a vinylaromatic monomer and forms a hard phase, and/or of a block B, which features diene monomers and forms a first, rubber-elastic (soft) phase, and of at least one block B/S, which is elastomeric, features copolymerized units of a vinylaromatic monomer and of a diene, and forms a soft phase, the glass transition temperature Tg of the block S being more than 250° C. and that of the blocks B and B/S being below 250° C., respectively, and the phase volume ratio of block S to block B/S being selected such that the fraction of the hard phase in the block copolymer as a whole is 1-40% by volume and the weight fraction of the diene is less than 50 wt %.

The block B/S which forms the soft phase and comprises diene and vinylaromatic units possesses a statistical construction, obtainable by polymerization in the presence of a polar cosolvent or randomizer.

The block copolymer A2 used in accordance with the invention may be represented for example by one of the general formulae 1 to 11:

$$B/S\text{-}(S\text{-}B/S)_n; \quad (3)$$

$$X\text{-}[(S\text{-}B/S)n]_{m+1}; \quad (4)$$

$$X\text{-}[(B/S\text{-}S)n]m+1; \quad (5)$$

$$X\text{-}[(S\text{-}B/S)n\text{-}S]m+1; \quad (6)$$

$$X\text{-}[(B/S\text{-}S)n\text{-}B/S]m+1; \quad (7)$$

$$Y\text{-}[(S\text{-}B/S)n]m+1; \quad (8)$$

$$Y\text{-}[(B/S\text{-}S)n]m+1; \quad (9)$$

$$Y\text{-}[(S\text{-}B/S)n\text{-}S]m+1; \quad (10)$$

$$Y\text{-}[(B/S\text{-}S)n\text{-}B/S]m+1; \quad (11)$$

where
S is a vinylaromatic block,
B/S is the soft phase composed of a block constructed randomly from diene units and vinylaromatic units,
X is the residue of an n-functional initiator,
Y is the residue of an m-functional coupling agent, and
m, n are natural numbers from 1 to 10.

Preference is given to a block copolymer A2 of one of the general formulae S-B/S-S, X-[-B/S-S]$_2$, and Y-[-B/S-S]$_2$ (abbreviations as defined above), and particular preference to a block copolymer whose soft phase is divided into blocks $$(B/S)_1\text{-}(B/S)_2; \quad (12)$$

$$(B/S)_1\text{-}(B/S)_2\text{-}(B/S)_1; \quad (13)$$

$$(B/S)_1\text{-}(B/S)_2\text{-}(B/S)_3; \quad (14)$$

where the indices 1, 2, and 3 stand for different structures in the sense that the vinylaromatic/diene ratio in the individual blocks B/S is different or changes continuously within a block in the limits of $(B/S)_1(B/S)_2$, with the glass transition temperature Tg of each subblock being below 25° C.

A block copolymer A2 which features two or more blocks B/S and/or S with different molar masses per molecule is likewise preferred.

Similarly, in place of a block S constructed exclusively of vinylaromatic units, there may be a block B, since overall the only important factor is that a rubber-elastic block copolymer A2 is formed. Such copolymers may have, for example, the structure (15) to (18)

$$B\text{-}(B/S) \quad (15)$$

$$(B/S)\text{-}B\text{-}(B/S) \quad (16)$$

$$(B/S)_1\text{-}B\text{-}(B/S)2 \quad (17)$$

$$B\text{-}(B/S)_1\text{-}(B/S)_2. \quad (18)$$

Preferred as vinylaromatic compound is styrene and also α-methylstyrene and vinyltoluene and also mixtures of these compounds. Preferred dienes are butadiene and isoprene, and also piperylene, 1-phenylbutadiene, and mixtures of these compounds.

One particularly preferred monomer combination is butadiene and styrene. All weight and volume figures below relate to this combination; where technical equivalents of styrene and butadiene are used, it may be necessary to convert the figures correspondingly.

The soft block is preferably constructed of 75-30 wt % styrene and 25-70 wt % butadiene. A soft block more preferably has a butadiene fraction of between 35 and 70% and a styrene fraction of between 65 and 30%.

The weight fraction of the diene in the overall block copolymer A2 in the case of the styrene/butadiene monomer combination is preferably 15-65 wt %, that of the vinylaromatic component, correspondingly, preferably 85-35 wt %.

Particularly preferred are butadiene-styrene block copolymers A2 having a monomer composition of 25-60 wt % diene and 75-40 wt % styrene.

The volume fraction of the soft phase in the solid body is of critical importance to the mechanical properties. In accordance with the invention, the volume fraction of the soft phase constructed from diene sequences and vinylaromatic sequences is 60-99, preferably 70-90, and more preferably 80-90 vol %. The blocks A formed from the vinylaromatic monomers form the hard phase, whose volume fraction accordingly is 1-40, preferably 10-35, and more preferably 15-30 vol %.

It should be noted that there is no strict match between the abovementioned proportions of vinylaromatic compound and diene, the above-stated limit values on the phase volumes, and the composition implied by the inventive ranges of glass transition temperature, since in each case the numerical values have been rounded to the nearest tens number. If such matches did occur, it would be coincidental.

The volume fraction of the two phases can be measured by means of phase-contrast electron microscopy or solid-state NMR spectroscopy. The fraction of the vinylaromatic blocks can be determined after osmium degradation of the polydiene fraction, by precipitation and weighing. The future phase ratio in a polymer may also be calculated from the amounts of monomer used, if polymerization is always allowed to proceed to completion.

The block copolymer A2 is unambiguously defined by the ratio of the volume fraction in percent of the soft phase formed from the B/S blocks and the fraction of diene units in the soft phase, which for the styrene/butadiene combination is between 25 and 70 wt %.

The glass transition temperature (Tg) is influenced by the random incorporation of the vinylaromatic compounds into the soft block of the block copolymer and by the use of Lewis bases during the polymerization. The glass transition temperature of the block copolymer A2 as a whole is preferably −50 to +25° C., more preferably −50 to +5° C.

The molecular weight of the block S is preferably 1000 to 200 000, more particularly 3000 and 80 000 [g/mol]. Within a single molecule, S blocks may differ in molar mass.

The molecular weight of block B/S is customarily from 2000 to 250 000 [g/mol]; preferred values are from 5000 to 150 000 [g/mol].

Like block S, the block B/S as well may take on different molecular weight values within a single molecule.

The coupling center X is formed by the reaction of the living anionic chain ends with at least one bifunctional coupling agent. Examples of such compounds are found in U.S. Pat. Nos. 3,985,830, 3,280,084, 3,637,554, and 4,091,053. Preference is given to using, for example, epoxidized glycerides such as epoxidized linseed oil or soybean oil; also suitable is divinyl-benzene. Suitable specifically for the dimerization are dichlorodialkylsilanes, dialdehydes such as terephthal-aldehyde, and esters such as ethyl formate or ethyl benzoate.

Preferred polymer structures A2 are S-B/S-S, X-[-B/S-S]2 and Y-[-B/S-S]$_2$, where the random block B/S may itself be subdivided in turn into blocks B1/S1-B2/S2-B3/S3-. . . . The random block is preferably composed of 2 to 15 random subblocks, more preferably of 3 to 10 subblocks.

The block copolymers A2 described above are likewise obtainable by anionic polymerization.

The aforementioned block copolymers A2 are known. Their preparation is described for example in publications WO 95/35335 A1 (pages 5 to 9) and WO 96/20248 A1 (pages 7 to 10).

Polymer B1

Suitability as polymer B1 is possessed by high-impact polystyrenes (HIPS) and standard polystyrenes (GPPS), whose preparation, structure, and properties are described in detail in the review literature (A. Echte, F. Haaf, J. Hambrecht in Angew. Chem. (Int. Ed. Engl.) 20, 344-361, (1981); and also in Kunststoffhandbuch, edited by R. Vieweg and G. Daumiller, volume 4 "Polystyrol", Carl-Hanser-Verlag Munich (1996).

The high-impact polystyrenes used may, furthermore, have been structurally modified through the use of specific polybutadiene rubbers—for example, with a 1,4-cis and/or 1,4-trans fraction or 1,2- and 1,4 linkage fraction modified relative to conventional rubbers. Furthermore, instead of polybutadiene rubber, it is also possible for other diene rubbers, and also elastomers of the type of ethylene-propylene-diene copolymer (EPDM rubber), and also hydrogenated diene rubbers, to be used.

Suitable standard polystyrene is prepared by the method of anionic or radical polymerization. The nonuniformity of the polymer, which may be influenced by the polymerization method, is of minor importance here. Preferred are standard polystyrene and high-impact polystyrene whose toluene-soluble fraction has an average molecular weight Mw of 50 000 to 500 000 g/mol and which optionally have also been equipped with additives, such as, for example, mineral oil (e.g., white oil), stabilizer, antistats, flame retardants or waxes.

SAN copolymers and α-methylstyrene-acrylonitrile copolymers (AMSAN) used as polymer B1 in accordance with the invention contain generally 18 to 35 wt %, preferably 20 to 32 wt %, more preferably 22 to 30 wt % of acrylonitrile (AN), and 82 to 65 wt %, preferably 80 to 68 wt %, more preferably 78 to 70 wt % of styrene (S) or α-methylstyrene (AMS), where the sum of styrene or α-methylstyrene and acrylonitrile makes 100 wt %.

The SAN and AMSAN copolymers used generally have an average molar mass Mw of 150 000 to 350 000 g/mol, preferably 150 000 to 300 000 g/mol, more preferably 150 000 to 250 000 g/mol, and very preferably 150 000 to 200 000 g/mol.

Suitable SAN copolymers are commercial SAN copolymers such as Luran® from Styrolution, for example. Preferred SAN copolymers are those having an S/AN ratio (in weight percent) of 81/19 to 67/33 and a MVR (measured to ISO 1133 at 220° C. and 10 kg load) of at least 10 ml/10 min such as Luran 368, for example.

SMMA copolymers used as polymer B1 in accordance with the invention contain generally 18 to 50 wt %, preferably 20 to 30 wt %, of methyl methacrylate (MMA), and 50 to 82 wt %, preferably 80 to 70 wt %, of styrene, where the sum of styrene and MMA makes 100 wt %.

SMSA copolymers used as polymer B1 in accordance with the invention contain generally 10 to 40 wt %, preferably 20 to 30 wt %, of maleic anhydride (MAN), and to 90 wt %, preferably 80 to 70 wt %, of styrene, where the sum of styrene and MAN, makes 100 wt %.

The aforementioned polymers B1 have a viscosity number VN (determined to DIN 53 726 at 25° C. on a 0.5 wt % strength solution of the polymer B1 in dimethylformamide) of 50 to 120, preferably 52 to 100, and more preferably 55 to 80 ml/g. The polymers B1 are obtained in a known way by bulk, solution, suspension, precipitation or emulsion polymerization, with bulk and solution polymerization being preferred. Details of these processes are described for example in Kunststoffhandbuch, edited by R. Vieweg and G. Daumiller, volume 4 "Polystyrol", Carl-Hanser-Verlag Munich 1996, p. 104 ff, and also in "Modern Styrenic Polymers: Polystyrenes and Styrenic Copolymers" (Eds., J. Scheirs, D. Priddy, Wiley, Chichester, UK, (2003), pages 27 to 29) and in GB-A 1472195.

Preference is given to using high-impact polystyrene and/or standard polystyrene as polymer B1.

Polymer B2

The molding composition of the invention may additionally comprise at least one further polymer B selected from polycarbonates, polyamides, poly(meth)acrylates, polyesters, semicrystalline polyolefins, polyvinylidene chloride, and polyvinyl chloride.

Polycarbonates suitable as polymer B2 are known per se. They are obtainable, for example, in accordance with the processes of DE-B-1 300 266, by interfacial polycondensation, or the process of DE-A 14 95 730, by reaction of biphenyl carbonate with bisphenols. A preferred bisphenol is 2,2-di(4-hydroxyphenyl)propane, referred to generally—and also below—as bisphenol A.

In place of bisphenol A it is also possible to use other aromatic dihydroxy compounds, especially 2,2-di(4-hydroxyphenyl)pentane, 2,6-dihydroxynaphthalene, 4,4'-dihydroxydiphenyl sulfone, 4,4'-dihydroxydiphenyl ether, 4,4'-dihydroxydiphenyl sulfite, 4,4'-dihydroxydiphenylmethane, 1,1-di(4-hydroxyphenyl)ethane or 4,4-dihydroxybiphenyl, and also mixtures of the aforesaid dihydroxy compounds.

Particularly preferred polycarbonates are those based on bisphenol A or bisphenol A together with up to 30 mol % of the aforementioned aromatic dihydroxy compounds.

The relative viscosity of these polycarbonates is generally in the range from 1.1 to 1.5, more particularly 1.28 to 1.4 (measured at 25° C. in a 0.5 wt % strength solution in dichloromethane).

Polyesters suitable as polymer B2 are likewise known per se and described in the literature. They include an aromatic ring in the main chain that originates from an aromatic dicarboxylic acid. The aromatic ring may also be substituted, as for example by halogen such as chloro and bromo or by C1-C4 alkyl groups such as methyl, ethyl, isopropyl and n-propyl, and n-butyl, isobutyl, and tert-butyl groups.

The polyesters may also be prepared in a way that is known per se through reaction of aromatic dicarboxylic acids, their esters or other ester-forming derivatives thereof with aliphatic dihydroxy compounds.

Preferred dicarboxylic acids are naphthalenedi-carboxylic acid, terephthalic acid, and isophthalic acid, or mixtures thereof. Up to 10 mol % of the aromatic dicarboxylic acids may be replaced by aliphatic or cycloaliphatic dicarboxylic acids such as adipic acid, azelaic acid, sebacic acid, dodecanedioic acids, and cyclohexanedicarboxylic acids.

Preferred among the aliphatic dihydroxy compounds are diols having 2 to 6 carbon atoms, especially 1,2-ethanediol, 1,4-butanediol, 1,6-hexanediol, 1,4-hexanediol, 1,4-cyclohexanediol, and neopentyl glycol, or mixtures thereof.

Particularly preferred polyesters are polyalkylene terephthalates which derive from alkanediols having 2 to 6 C atoms. Preferred especially among these are polyethylene terephthalate, polyethylene naphthalate, and polybutylene terephthalate.

The viscosity number of the polyesters is situated in general in the range from 60 to 200 ml/g (measured in a 0.5 wt % strength solution in a phenol/o-dichlorobenzene mixture (weight ratio 1:1 at 25° C.)).

Mentioned in particular as poly(meth)acrylates suitable as polymer B2 may be polymethyl methacrylate (PMMA) and also copolymers based on methyl methacrylate with up to 40 wt % of further copolymerizable monomers, of the kind available, for example, under the designations Lucryl® from Lucite or Plexiglas° from Evonik.

Further suitable polymers B are partially crystalline, preferably linear polyamides such as polyamide 6, polyamide 6,6, polyamide 4,6, polyamide 6,12, and partially crystalline copolyamides based on these components are suitable. It is further possible to use partially crystalline polyamides whose acid component consists wholly or partly of adipic acid and/or terephthalic acid and/or isophthalic acid and/or suberic acid and/or sebacic acid and/or azelaic acid and/or dodecanedicarboxylic acid and/or a cyclohexane-dicarboxylic acid, and whose diamine component consists wholly or partly in particular of m- and/or p-xylylene-diamine and/or hexamethylenediamine and/or 2,2,4- and/or 2,4,4-trimethylhexamethylenediamine and/or isophoronediamine, and whose compositions are known in principle (cf. Encyclopedia of Polymers, vol. 11, p. 315 ff.).

The molecular weight Mn (number average) of the polyamides suitable as polymer B are preferably in the range between 5000 and 100 000, more preferably between 10 000 and 80 000.

Suitability is possessed by partially crystalline linear polyamides, for example, having a relative viscosity of 2.2 to 4.5, measured in 0.5% strength solution (0.5 g/l00 ml) in 96 wt % strength sulfuric acid at 25° C. Preferred polyamides are those deriving wholly or partly from lactams having 7 to 13 ring members, such as polycaprolactam, polycaprylyllactam or polyurolactam.

Further suitable are polyamides obtained by reacting dicarboxylic acids with one or more diamines. Examples of suitable dicarboxylic acids are alkanedicarboxylic acids having 6 to 12, especially 6 to 10, carbon atoms, especially adipic acid. Examples of suitable diamines are alkane- or cycloalkanediamines having 4 to 12, especially 4 to 8, carbon atoms; hexamethylenediamine, m-xylylenediamine, bis(4-aminophenyl)methane, bis(4-aminocyclohexyl)methane or 2,2-bis(4-amino-phenyl)propane, or mixtures thereof, are particularly suitable partners for preparing such polyamides. It may be advantageous to prepare the stated polyamides per se and to use mixtures thereof.

Of particular technical significance are polyamide 6 (polycaprolactam), polyamide 6,6 (polyhexamethylene-adipamide), and polyamides composed of at least 80 wt % of repeating units of the formula —[—NH—(CH2)4-NH—CO—(CH2)4-CO—)—. The last-mentioned polyamides are obtainable by condensing 1,4-diaminobutane with adipic acid. Suitable preparation processes for polyamides are described for example in EP-A-38 094, EP-A-38 582, and EP-A-39 524.

Likewise suitable are polyamides with a small fraction, preferably up to about 10 wt %, of other cocondensable constituents, especially other amide formers such as, for example, a,w-amino acids or N-carboxylic anhydrides (Leuchs anhydrides) of amino acids.

Particularly preferred are partially aromatic copolyamides B containing 40 to 90 wt % of units deriving from terephthalic acid and hexamethylenediamine. A small fraction of the terephthalic acid, preferably not more than 10 wt % of the total amount of aromatic dicarboxylic acids used, may be replaced by isophthalic acid or other aromatic dicarboxylic acids, preferably those in which the carboxyl groups are in para position.

Besides the units deriving from terephthalic acid and hexamethylenediamine, the partially aromatic copolyamides contain units which derive from ε-caprolactam and/or units which derive from adipic acid and hexamethylenediamine.

The fraction of units deriving from ε-caprolactam is up to 50 wt %, preferably 20 to 50 wt %, especially 25 to 40 wt %, while the fraction of units deriving from adipic acid and hexamethylenediamine is up to 60 wt %, preferably 30 to 60 wt %, and especially 35 to 55 wt %.

The copolyamides may also contain both units of ε-caprolactam and units of adipic acid and hexamethylenediamine; in this case, the fraction of units which are free from aromatic groups is preferably at least 10 wt %, more preferably at least 20 wt %. The ratio of the units deriving from e-caprolactam and from adipic acid and hexamethylenediamine is not subject to any particular restriction here.

The melting point of particularly suitable partially aromatic copolyamides is situated for example in the range from 260 to more than 300° C., this high melting point also being associated with a high glass transition temperature of generally more than 75° C., especially more than 85° C. Binary copolyamides based on terephthalic acid, hexamethylenediamine, and ε-caprolactam, for a content of about 70 wt % of units deriving from terephthalic acid and hexamethylenediamine, have a melting point in the range of 300° C. and a glass transition temperature of more than 110° C.

Binary copolyamides based on terephthalic acid, adipic acid, and hexamethylenediamine reach a melting point of 300° C. or more at a level of just about 55 wt % of units of terephthalic acid and hexamethylenediamine, with the glass transition temperature being not quite as high as for binary copolyamides which comprise ε-caprolactam in place of adipic acid or adipic acid/hexamethylene-diamine.

Suitable partially aromatic copolyamides can be prepared by the processes described in EP-A 129 195 and EP-A 129 196.

In accordance with the invention, furthermore, amorphous polyamides can be used as polymer B2. Based on the monomers already stated, additional monomers, frequently provided with one or more crystallization-hindering side groups, are cocondensed. As a result, the polyamide obtained is generally transparent.

Additionally suitable as polymer B2 are semicrystalline polyolefins, preferably homopolymers and copolymers of C1-C8 olefins such as ethylene, propylene, but-1-ene, pent-1-ene, hex-1-ene, hept-1-ene, 3-methylbut-1-ene, 4-methylbut-1-ene, 4-methylpent-1-ene, and oct-1-ene. Suitable polyolefins accordingly for example are polyethylene, polypropylene, polybut-1-ene or poly-4-methylpent-1-ene. In general a distinction is made among polyethylene (PE) between high-density PE (HDPE), low-density PE (LDPE), and linear low-density PE (LLDPE).

Polyolefins suitable with preference as component B2 are polyethylene, polypropylene, and poly-4-methylpent-1-ene, more particularly polyethylene and polypropylene.

Additionally as polymer B2 it is possible to use halogenated polymers such as polyvinylidene chloride and polyvinyl chloride (PVC). PVC is preferably used in modified form. Modification is carried out using low molecular mass plasticizers (e.g., dioctyl phthalate, dioctyl adipate) and/or polymeric compounds.

PVC may be prepared by polymerization in suspension, emulsion or bulk processes. Mixtures of PVC with plasticizers generally further comprise processing stabilizers.

PVC which can be processed without plasticizers is prepared preferably by (suspension) graft polymerization of vinyl chloride onto an elastomer. The elastomer may consist of polybutadiene and/or polyacrylate rubber.

Additives and/or Auxiliaries C

The molding composition of the invention may optionally comprise customary additives and/or auxiliaries C such as stabilizers, oxidation retarders, agents to counter thermal decomposition and decomposition due to ultraviolet light, lubricants and mold release agents, colorants such as dyes and pigments, fibrous and pulverulent fillers and reinforcing agents, nucleating agents, plasticizers, etc., the fraction thereof being in general not more than 50 wt %, preferably not more than 40 wt %.

Examples of oxidation retarders and heat stabilizers are halides of the metals from group I of the periodic table, examples being sodium, potassium and/or lithium halides, optionally in combination with copper(I) halides, e.g., chlorides, bromides, iodides, sterically hindered phenols, hydroquinones, different substituted representatives of these groups, and mixtures thereof, in concentrations of up to 1 wt %, based on the weight of the thermoplastic molding composition.

UV stabilizers, used generally in amounts of up to 2 wt %, based on the molding composition, include various substituted resorcinols, salicylates, benzotriazoles, and benzophenones.

Furthermore, organic dyes may be added, such as nigrosine, pigments such as titanium dioxide, phthalocyanines, ultramarine blue, and carbon black as colorants, and also fibrous and pulverulent fillers and reinforcing agents. Examples of the latter are carbon fibers, glass fibers, amorphous silica, calcium silicate (wollastonite), aluminum silicate, magnesium carbonate, kaolin, chalk, powdered quartz, mica, and feldspar. The fraction of such fillers and colorants is generally up to 50 wt %, preferably up to 35 wt %.

Examples of nucleating agents that can be used are talc, calcium chloride, sodium phenylphosphinate, aluminum oxide, silicon dioxide, and nylon 22.

Examples of lubricants and mold release agents, which can be used in general in amounts up to 1 wt %, are long-chain fatty acids such as stearic acid or behenic acid, their salts (e.g., Ca or Zn stearate) or esters (e.g., stearyl stearate or pentaerythrityl tetra-stearate), and also amide derivatives (e.g., ethylene-bisstearylamide). For better processing, mineral-based antiblocking agents may be added in amounts up to 0.1 wt % to the molding compositions of the invention. Examples include amorphous or crystalline silica, calcium carbonate, or aluminum silicate.

Processing assistants which can be used are, for example, mineral oil, preferably medical white oil, in amounts up to 5 wt %, preferably 2 wt %.

Examples of plasticizers include dioctyl phthalate, dibenzyl phthalate, butyl benzyl phthalate, hydrocarbon oils, N-(n-butyl)benzenesulfonamide, and o- and p-tolylethylsulfonamide.

For further improving the resistance to inflammation, it is possible to add all of the flame retardants known for the thermoplastics in question, more particularly those flame retardants based on phosphorus compounds and/or on red phosphorus itself.

The molding compositions of the invention may be produced from components A and optionally further polymers B1 and B2 and additives and/or auxiliaries C by all known methods. Preferably, however, the components are blended by melt mixing, as for example by joint extruding, kneading or roller treatment of the components. This is performed at temperatures in the range from 160 to 400° C., preferably from 180 to 280° C. The molding compositions of the invention can be produced by methods that are known per se. Judiciously this is done using extruders, examples being single-screw or twin-screw extruders or other conventional plastifying devices such as Brabender mills or Banbury mills.

A feature of the molding composition used in accordance with the invention is that its residual monomer content is not more than 1000 ppm, preferably not more than 500 ppm, more preferably not more than 250 ppm.

Residual monomer content refers to the fraction of unreacted (uncopolymerized) monomer in the molding composition.

The low residual monomer content is based on the one hand on the fact that the block copolymers A present in the molding composition are prepared preferably by anionic polymerization, and so the monomers supplied are incorporated fully by polymerization into the growing polymer chain.

Furthermore, the molding composition used in accordance with the invention features a solvent content (such as the content of ethylbenzene, toluene, cyclohexane, etc.), for example, of not more than 1000 ppm, preferably not more than 500 ppm, more preferably not more than 200 ppm.

The low residual monomer content and solvent content can further be obtained by employing customary methods for reducing residual monomers and solvents from polymer melts, as described for example in Kunststoffhandbuch, Eds. R. Vieweg and G. Daumiller, vol. 4 "Polystyrol", Carl-Hanser-Verlag Munich (1996), pp. 121 to 139. In these methods, typical devolatizing apparatuses, such as, for example, partial vaporizers, flat evaporators, strand devolatilizers, thin-film evaporators or devolatilizing extruders, for example, are used.

As a result of the low residual monomer content and also solvent content, the molding composition used in accordance with the invention is low in odor and is therefore outstandingly suitable for 3D printers in the home-use segment.

In order to prevent severe contraction, the coefficient of linear thermal expansion, CLTE, of the molding composition of the invention is preferably below $100 \times 10^{-6}$ 1/K, more preferably below $85 \times 10^{-6}$ 1/K. A CLTE value of this kind can be set through the addition of additives, more particularly minerals (mineral additives C) such as fibrous and pulverulent fillers and reinforcing agents and/or pigments, preferably finely divided minerals having an average particle size of <500 µm, preferably <100 µm, in amounts of 0 to 40 wt %, based in each case on the overall molding composition.

If the molding composition of the invention comprises, as additive C, no quantities or only small quantities (0 to 10 wt %, based on the overall molding composition) of minerals such as fibrous and pulverulent fillers and reinforcing agents and/or pigments, the diene fraction b) of the vinylaromatic-diene block copolymer A in the molding composition is preferably not more than 35 wt %, more preferably not more than 30 wt %, very preferably not more than 25 wt %.

Examples of suitable minerals (mineral additives) are carbon fibers, glass fibers, amorphous silica, calcium silicate (wollastonite), aluminum silicate, magnesium carbonate, kaolin, chalk, powdered quartz, mica, and feldspar.

According to one particular embodiment, the molding composition of the invention comprises:
20 to 100 wt % of block copolymer A,
0 to 80 wt % of polymer B1, in particular standard polystyrene and/or high-impact polystyrene,
0 to 30 wt % of polymer B2, and
0.1 to 40 wt % of minerals C,
based in each case on the overall molding composition, and where the sum of A; B1, B2 and C is 100 wt %.

According to a further preferred embodiment, the molding composition of the invention comprises:
20 to 100 wt % of block copolymer A,
0 to 80 wt % of polymer B1, more particularly standard polystyrene and/or high-impact polystyrene,
0 to 30 wt % of polymer B2, and
0 to 40 wt % of additives and/or auxiliaries C, more particularly minerals C,
based in each case on the overall molding composition, and where the sum of A; B1, B2, and C makes 100 wt %.

According to a further preferred embodiment, the molding composition of the invention comprises:
20 to 99.9 wt % of block copolymer A,
0 to 79.9 wt % of polymer B1, more particularly standard polystyrene and/or high-impact polystyrene,
0 to 30 wt % of polymer B2, and
0.1 to 40 wt % of additives and/or auxiliaries C, more particularly minerals C,
based in each case on the overall molding composition, and where the sum of A; B1, B2, and C makes 100 wt %.

Further preferred is a molding composition of the aforesaid embodiment in which there is no polymer B2 present.

Particularly preferred is a molding composition of the invention comprising:
30 to 80 wt % of block copolymer A,
20 to 70 wt % of polymer B1, more particularly standard polystyrene and/or high-impact polystyrene,
0.2 to 30 wt % of minerals C,
based in each case on the overall molding composition, and where the sum of A; B1, and C makes 100 wt %.

Further particularly preferred is a molding composition of the invention comprising:
30 to 79.8 wt % of block copolymer A,
20 to 69.8 wt % of polymer B1, more particularly standard polystyrene and/or high-impact polystyrene,
0.2 to 30 wt % of minerals C,
based in each case on the overall molding composition, and where the sum of A; B1, and C makes 100 wt %.

If the fraction of the minerals C in the aforesaid preferred molding compositions is less than 10 wt %, then preferably the diene fraction b) of the vinylaromatic-diene block copolymer A is not more than 35 wt %, preferably not more than 30 wt %, very preferably not more than 25 wt %.

The viscosity of the overall molding composition at shear rates of 1 to 10 1/s and at temperatures of 250° C. is not higher than $1 \times 10^5$ Pa*s, preferably not higher than $1 \times 10^4$ Pa*s, more preferably not higher than $1 \times 10^3$ Pa*s.

The melt volume rate (MVR, measured to ISO 1133 at 220° C. and 10 kg load) is generally more than 6 ml/10 min, preferably more than 8 ml/10 min, more preferably more than 12 ml/10 min.

The aforementioned molding compositions are used in accordance with the invention for producing three-dimensional objects of predetermined shape by means of a device for 3D printing.

It is possible here to use customary apparatuses suitable for 3D printing, especially 3D printers for home use.

The three-dimensional object is generally built up under computer control from the fluidized molding composition used in accordance with the invention, according to mandated dimensions and shapes (CAD).

The three-dimensional object can be produced using customary methods of 3D printing in accordance with the prior art as described for example in EP-A 1015215 and in US 2009/0295032.

Customarily, first of all, the molding composition is fluidized and extruded, a plurality of layers of the molding composition are applied to a base such as a support or to a preceding layer of the molding composition, and then the shaped material is consolidated by cooling below the solidification temperature of the molding composition.

The molding compositions used in accordance with the invention exhibit an optimized toughness/viscosity balance and are therefore outstandingly suitable for 3D printing. A further advantage for the home-use sector is that the molding composition is of low odor, having only a low residual monomer content and also solvent content.

The invention claimed is:

1. A method of 3D printing, comprising a step of fluidizing and extruding a molding composition to form an object,
   wherein the molding composition comprises components A, B1, B2, and C:
   A: 5 to 100 wt % of at least one vinylaromatic-diene block copolymer A prepared by anionic polymerization containing a random construction of:
      40 to 95 wt % of at least one vinylaromatic monomer (S), and
      5 to 60 wt % of at least one diene monomer (B),
      where (S) and (B) add up to 100 wt %,
      wherein block copolymer A comprises at least one block (B/S) which forms a soft phase,
   B1: 0 to 95 wt % of at least one polymer B1 selected from the group consisting of: standard polystyrene and high-impact polystyrene,
   B2: 0 to 60 wt % of one or more further polymers B2 selected from: polycarbonates, polyamides, poly(meth)acrylates, polyesters, semicrystalline polyolefins, and polyvinyl chloride,
   C: 0 to 50 wt % of customary additives and auxiliaries,
   wherein the viscosity (measured to ISO 11443) of the molding composition at shear rates of 1 to 10 1/s and at temperatures of 250° C. is not higher than $1 \times 10^5$ Pa*s and the melt volume rate (MVR, measured to ISO 1133 at 220° C. and 10 kg load) is more than 6 ml/10 min,
   wherein a 3D printer is used for the 3D printing.

2. A method of claim 1, wherein the at least one vinylaromatic-diene block copolymer A is a styrene-butadiene block copolymer, wherein the at least one vinylaromatic monomer (S) is styrene and the at least one diene monomer (B) is butadiene.

3. A method of claim 1, wherein the molding composition comprises:
   20 to 99.9 wt % of the at least one vinylaromatic-diene block copolymer A,
   0 to 79.9 wt % of the at least one polymer B1,
   0 to 30 wt % of the one or more further polymers B2, and
   0.1 to 40 wt % of the customary additives and auxiliaries C.

4. A method of claim 1, wherein the molding composition comprises:
   30 to 79.8 wt % of the at least one vinylaromatic-diene block copolymer A, 20 to 69.8 wt % of the at least one polymer B1,
0.2 to 30 wt % of the customary additives and auxiliaries C.

5. A method of claim 1, wherein the molding composition has a residual monomer content of not more than 1000 ppm.

6. A method of claim 1, wherein a coefficient of linear thermal expansion CLTE of the molding composition is less than $100 \times 10^{-6}$ 1/K.

7. A method of claim 1, wherein the molding composition comprises:
20 to 99.8 wt % of the at least one vinylaromatic-diene block copolymer A,
0.1 to 79.8 wt % of the at least one polymer B1,
0 to 30 wt % of the one or more further polymers B2, and
0.1 to 40 wt % of the customary additives and auxiliaries C.

8. A method of claim 1, wherein the molding composition comprises:
40 to 60 wt % of the at least one vinylaromatic-diene block copolymer A,
40 to 60 wt % of the at least one polymer B1,
0.2 to 10 wt % of the customary additives and auxiliaries C.

9. A method of claim 2, wherein the styrene in the styrene-butadiene block copolymer is present in an amount of 40-85 wt % and the butadiene in the styrene-butadiene block copolymer is present in an amount of 15-60 wt %.

10. The method of claim 1, wherein the at least one vinylaromatic-diene copolymer A comprises:
(1) at least two hard blocks of the at least one vinylaromatic monomer (S) and
(2) at least one soft block of the at least one diene monomer (B) and optionally the at least one vinylaromatic monomer (S),
wherein the at least one soft block (2) is in-between the at least two hard blocks (1), and the amount of the hard blocks (1) being more than 40 wt % but less than 95 wt %, based on the at least one vinylaromatic-diene block copolymer A.

11. The method of claim 10, wherein the at least one vinylaromatic-diene copolymer A comprises:

(1) the at least two hard blocks of the at least one vinylaromatic monomer (S) and
(2) the at least one soft block of the at least one diene monomer (B) and the at least one vinylaromatic monomer (S).

12. A method of claim 1, wherein the block copolymer A is a block copolymer A1 with at least two random (B/S) blocks.

13. A method of claim 1, wherein the block copolymer A is a block copolymer A2 with a random (B/S) block represented by one of formulae 1 to 11:

$$(S-B/S)_n; \tag{1}$$

$$(S-B/S)_n-S; \tag{2}$$

$$B/S-(S-B/S)_n; \tag{3}$$

$$X-[(S-B/S)n]_{m+1}; \tag{4}$$

$$X-[(B/S-S)n]m+1; \tag{5}$$

$$X-[(S-B/S)n-S]m+1; \tag{6}$$

$$X-[(B/S-S)n-B/S]m+1; \tag{7}$$

$$Y-[(S-B/S)n]m+1; \tag{8}$$

$$Y-[(B/S-S)n]m+1; \tag{9}$$

$$Y-[(S-B/S)n-S]m+1; \tag{10}$$

$$Y-[(B/S-S)n-B/S]m+1; \tag{11}$$

where
X is a residue of an n-functional initiator,
Y is a residue of an m-functional coupling agent, and
m, n are natural numbers from 1 to 10.

* * * * *